Patented Oct. 17, 1950

2,525,761

UNITED STATES PATENT OFFICE 2,525,761

SUGAR AND EDIBLE SIRUP AND PROCESS FOR PREPARING SAME FROM SUGAR BEARING FLUIDS

John Paul Bartz, Fort Lauderdale, Fla.

No Drawing. Application October 25, 1946,
Serial No. 705,805

22 Claims. (Cl. 99—142)

This invention relates generally to the manufacture of mono and di saccharide sugars, and particularly to a process for preparing liquid sugars and edible syrups for human consumption from sugar bearing fluids such as fruit juices of oranges, grapefruit, tangerines, pineapples, grapes and the like, waste citrus juices and citrus press waters discarded by the citrus canning industry and those sugar bearing fluids unfit for human consumption such as blackstrap, beet, high test and citrus molasses.

Heretofore, sucrose, the table sugar of commerce, has been prepared in two separate and distinct operations, namely, (1) The manufacture of raw sugar and (2) The refining of the raw sugar into white sucrose. Raw sugar is usually made by treating the juices obtained from sugar cane or sugar beets with milk of lime to remove a portion of the colloidal matter with subsequent adjustment of the hydrogen ion concentration, removal of a portion of the coloring matter, evaporation of the sugar solution, and crystallization. Upon reaching the desired concentration brown crystals of raw sucrose separate out. The sugar crystals may be separated from the mother liquor by centrifuging and liquor concentrated further with the subsequent formation of more sugar. Upon continuation a point is reached where no more sugar will crystallize out from the mother liquor. This liquor is known as final molasses.

The present methods and processes for the manufacture of sucrose have numerous objectionable features: (1) The raw sugar formed by present processes does not have an acceptable retail market as it contains traces of gums, mineral salts, colored pigments and mud which are objectionable to the trade. Furthermore, raw sugar is hydroscopic, that is, it will take up moisture and cake in the container thus making it difficult to remove and handle. (2) The raw sugar crystals formed in these processes must be refined before they may become the white table sugar of commerce. The refining requires separate operations, additional equipment, extra labor and time. The raw sugar crystals should not be confused with the brown sugar of commerce as they are not the same or identical. (3) Present processes for the production of sucrose are not efficient. From 16–30 per cent of the sucrose in the juice cannot be removed from the mother liquor and is permitted to remain in the final molasses which is unfit for human consumption. None of the reducing sugars such as glucose is removed from the juice nor is any of the levulose made available for human consumption. These sugars become a part of the final molasses and in normal times much of the molasses is discarded by the sugar industry. Furthermore, no use has been made of the valuable pectins and gums. The above represents a waste of valuable food material as well as time and money. It is obvious if one could remove all of the sugar from sugar cane or sugar beet juice in their pure crystalline state or as liquid sugar the efficiency, revenue, and usefulness of the entire sugar processing operation would be enhanced. In normal times it may mean the difference between profit and loss in the final sugar operation. Heretofore, this has not been accomplished. (4) Present manufacturing processes are not adaptable for making liquid syrup. The sugar industry has directed its efforts to producing only sucrose in the crystalline form and the working processes have been developed with this in mind. As a result sucrose will not remain in solution in high concentrations which is essential for a liquid sugar.

The juices of ripened citrus fruits are rich in sugars. Under present practices in the citrus canning industry a significant percentage of the total sugars of the juices is allowed to escape in the discarded press waters. This is a virgin field for producing liquid sugar from fruit juices. However, the processing of this juice is not as easy as it appears. Citrus fruit juices contain organic acids such as citric, maleic etc., bitter glucosides, protein, gums, etc., which upon concentration impart a very bitter taste to either syrup or molasses making it unfit for human consumption. Heretofore many attempts have been made to remove the foreign matter, bitter glucosides but all have ended in failure.

The present invention is directed toward overcoming the above difficulties and to a basic process for the production of liquid sugars and edible syrups from sugar bearing fluids such as cane and beet juices, fruit juices, and liquid molasses products of varied type unfit for human use.

One object of the present invention generally stated is to provide a process for the manufacture of liquid sugar from sugar bearing fluids in one continuous operation.

Another object of the present invention is to provide a process for the manufacture of liquid sugar and syrup from cane and beet juices in one continuous operation whereby more total sugars and valuable food constituents are recovered from the juice for human use than obtained from any other prior process or method.

A particular object of this invention is to provide a process for the manufacture of liquid sugars and edible syrups from molasses unfit for human consumption.

A special object of this invention is to provide a process whereby fruit juices and citrus press waters are so treated that sugars and edible syrups formed therefrom are of superior quality and free from objectionable flavors and bitter principles.

A final object of this invention is to provide a liquid composition of matter adaptable for use in food products, table use, jellies, beverages and the like which will supply the trade with a new, distinctive and superior edible product.

In accordance with this invention mono and di saccharide sugars, liquid sugar, and edible syrups may be produced or manufactured economically and efficiently from sugar bearing fluid cited herein by a continuous process instead of two separate and distinct processes as used in the manufacture of sucrose. Generally stated this process employs the following systematic steps: (1) Removal of objectionable dirt, inert solids and foreign matter by filtration or centrifuging, (2) Hydrolysis of polysaccharides, glucosides, gums, pectins and the like into edible sugars, (3) Removal of any remaining proteins, gums, pectins, organic acids and acidic substances by neutralization and precipitation by treating the sugar bearing fluid with a basic compound or salt. This step also removes a significant percentage of the cations and anions from the fluid as insoluble salts. (4) Removal of the metallic ion of the basic compound or salt by means of an organic acid. (5) Final removal of organic acid, remaining pigments and bitter principles from the sugar solution by means of activated charcoal such as animal charcoal (bone). (6) Evaporation and concentration of liquid sugar or syrup to the desired Beaumé under reduced pressure.

By sugar bearing fluid is meant the juices of sugar cane, sugar beets, fruit juices of oranges, grapefruit, tangerines, pineapples, grapes and other like fruits, waste citrus juices and press waters, molasses unfit for human use such as blackstrap, beet, high test and citrus. It also includes the liquids expressed from vegetables and root crops rich in sugar or carbohydrates.

To illustrate the application of the present invention more specifically wherein mono and di saccharide sugars, liquid sugar or edible syrup is desired from cane or beet juice the following is cited:

Sugar cane juice may be obtained by customary sugar manufacturing procedures. It is then filtered or centrifuged to remove objectionable mud materials, inert solids and fibrous matter. The juice which is acid in character is adjusted to the proper hydrogen ion concentration and heated from 50°–100° C. to hydrolyze the gums, pectins and other polysaccharides into simple sugars. Either acid or alkaline hydrolysis is satisfactory but the former is to be preferred. 72° C. is the preferred temperature. A hydrogen ion concentration ranging from a pH of 1.5 to 6.5 has been found to be satisfactory. However, a pH of 2.0 to 4.5 is to be preferred. Having adjusted the hydrogen ion concentration the cane juice is heated to the desired temperature (72° C.) until part of, or all of the valuable polysaccharides are hydrolyzed into simple sugars but not long enough to change a significant percentage of the sucrose. The time required usually ranges from 5 to 20 minutes. To 100 parts of hot cane juice (50–100° C.) containing from 5 to 20 per cent sucrose is added ¼ to 2 per cent of a basic compound or salt or enough to precipitate colloidal matter, gums, pectins and certain anions. A few of the basic compounds which may be used include basic aluminum acetate, basic aluminum boro acetate, basic calcium, barium and strontium salts or compounds, basic lead acetate. Unslaked lime may be used but it is not nearly as efficient as basic lead acetate which will be used for illustration purposes. After adding the required amount of basic lead acetate the precipitate which is colloidal is allowed to settle to bottom of the container or tank. The desired temperature for this reaction is 72° C. Any excess acid is neutralized with lime and the hydrogen ion concentration brought up to a pH of 7.0. The precipitate formed is allowed to settle for 1–12 hours and the aqueous sugar solution drawn or pumped off and filtered. Either a leaf type filter or press type filter may be used for this purpose to separate the solids from the liquid. Care must be exercised in handling of basic lead acetate as it is poisonous. It is equally important that all of the lead be removed from the sugar solution. For this reason this compound has not been successfully used heretofore. An excess amount of oxalic acid is then added to the filtered sugar solution to remove any and all lead remaining. Lead oxalate is extremely insoluble in oxalic acid. Usually ¼ to 2 per cent of oxalic acid is sufficient to precipitate all of the lead as lead oxalate. The precipitate is allowed to settle to the bottom of the container or tank and sugar liquid drawn or pumped off of the precipitate and filtered. In this way it is possible to filter solution and free it from the lead as the latter remains at bottom of tank and left there, and later utilized for insecticide purposes. A press type filter has been found to be satisfactory for this purpose using duck cloth and filter paper. The filtrate or sugar solution at this point should have a hydrogen ion concentration ranging from a pH of 1.9 to 3.0. ½ to 3 per cent activated animal bone charcoal is now added to the sugar filtrate solution and heated to 50–100° C. for 10 minutes with continuous stirring and allowed to cool. The charcoal adsorbs the coloring matter, any remaining bitter principles and lead salts in the event that any should have slipped through the filtering process. As an alternate to using small amounts of finely ground charcoal, the acidified sugar solution may be poured over granulated animal bone charcoal (pea size) until all of the charcoal is covered with liquid and allowed to stand for 10–24 hours. In either case all of the coloring matter is adsorbed and a water white solution results. Oxalic acid is especially adapted for this type of adsorption as it reacts or carries the pigments into the charcoal so that it may be readily absorbed. Furthermore oxalic acid is readily adsorbed by animal bone charcoal itself, and it is a convenient way of removing this substance from the field of action. As animal bone charcoal may or can be reactivated, it makes little difference whether one uses small or large amounts of bone char as the total cost of the liquid sugar is not materially increased as a result thereof. As is to be expected it takes less time to perform a given task when large amounts of char are employed and it is more efficient. The clear bland aqueous solution is then filtered and evaporated under reduced pressure to 37 to 47 degrees Beaumé liquid sugar.

The above process is new, novel and distinctive as the sugar industry has directed its attention only to the production of sucrose from cane or beet juices in the crystalline state and not in the liquid form as herein disclosed. Furthermore, present sugar manufacturers are concerned with producing sucrose and not the total sugar from the juice. By the process herein disclosed it is possible to obtain 15 to 25 per cent more sucrose from a given amount of cane juice than has been obtained heretofore. This does not include the glucose, fructose or levulose and other simple sugars obtained from the juice. Due to inefficiencies in the present sugar processes from 15–30 per cent of the sucrose in the original cane juice is allowed to remain in the molasses and is therefore not available for human use. None of the reducing sugars are obtained from the cane juice by present processes. Again there is no molasses formed by my process as the maximum amount of sugar is obtained from the juice and made into liquid sugar. There is little or no waste. The cost of producing or manufacturing a given unit of sweetness from a given amount of juice is considerably less by this method. There is no refining loss of sucrose by this method.

Liquid sugar as herein disclosed is a new and distinctive type of product which heretofore has never been prepared commercially from sugar cane or sugar beet juice. Liquid sugar may be colored or it may be made water white in appearance which is usually indicative of quality. Aside from its sucrose content it is rich in glucose or dextrose, fructose or levulose, and a small amount of pentose sugars. It is to be distinctively understood that liquid sugar prepared by the process herein disclosed will contain a measurable amount of valuable nutritional nonsugar solids, which will serve as a means of identifying the product with the process. The nonsugar solids may be in the form of essential minerals, water-soluble vitamins such as vitamin $B_1$, biotin, riboflavin, nitrogenous bodies, outstanding pectin like substances, nucleic acids and the like. As little as 5 micrograms of vitamin $B_1$ per 100 grams of syrup can be measured quantitatively. As much as 12 per cent of nonsugar solids may be permissible. Liquid sugar is a desirable and a convenient form to supply sweetness in the manufacture of confectionery, food products, bakery goods, jellies, jams and preserved fruits and the like. It is obvious from the above that my liquid sugar is a new, distinctive, superior and outstanding sugar product as well as a nutritional food.

If mono and di saccharide sugars are desired in solid form liquid sugar may be spray dried, drum dried or it may be concentrated and allowed to crystallize and the respective sugars separated in usual manner.

A specific example of the application of the present invention for the production of liquid sugar and edible syrup from a molasses unfit for human use such as high test, blackstrap, beet, citrus and the like is shown below:

To 100 parts of blackstrap molasses with a Beaumé of 42-47 degrees is added 400 parts of water and the mixture stirred very carefully 10 minutes and filtered. A leaf type filter is satisfactory for this purpose. The filtration removes dirt, inert solids and fibrous matter. The filtered molasses is treated with aqueous sulphuric acid until a hydrogen ion concentration with a pH of 2.5 is reached. This is the preferred acidity but a pH of 2.5 to 6.0 will work. The molasses solution is heated to hydrolyze the gums, pectins and other polysaccharides at a temperature ranging from 50-100° C. (72° C. preferred). The time required ranges from 10 to 40 minutes. Alkaline hydrolysis may be used if desired. After the acid hydrolysis is completed the pH of the aqueous molasses solution is adjusted to 4.5 by the addition of slaked lime. At this point ¼ to 1 per cent of a basic compound or salt is added. By basic compound is meant a compound which will give hydroxyl ion in aqueous solution and one in which all of the base has not been neutralized in the formation of the compound. Compounds or salts such as basic aluminum acetate, basic boro aluminum acetate, basic calcium salts, basic lead acetate and the like may be used. In this instance basic lead acetate is used for illustration purposes. Upon addition of the above amount of basic lead acetate at 72° C. a copious precipitate is formed. Unhydrolyzed protein, pectins, gums and insoluble lead salts are precipitated. The aqueous sugar solution is drawn or pumped off and filtered. As this solution is approximately 10-12 degrees Beaumé little difficulty is encountered in filtering. The leaf or press type filter may be used. If so desired the Beaumé of the molasses solution may be as high as 35 degrees Beaumé but the molasses filters only under high pressure 50-200 lbs. and the rate of flow is very slow. Furthermore, the basic salt must be increased accordingly and that affects the price of the finished product. After the sugar solution is filtered it is treated with ¼ to 2 per cent oxalic acid or enough to precipitate all of the lead as lead oxalate. The pH of the sugar solution is or should be approximately 2.0. The solubility of lead in oxalic solution is less than 1 part in a million and may be considered lead free as it cannot be detected or measured. Here again the precipitate of lead oxalate is allowed to settle out of the field of action of the liquid solution. The sugar liquid is then pumped off from the top of the tank and filtered through duck cloth and filter paper. This will remove any insoluble lead oxalate suspended in the sugar solution. At this point the clear sugar filtrate should be checked quantitatively to determine if the solution is lead free. If so, one can proceed. If not, the solution should be freed of any remaining lead by electrolytic methods. For this work stainless steel tanks are satisfactory. Copper lined tanks may be helpful in clarification work. The lead free sugar solution obtained above is then treated with animal charcoal, ½ to 3 per cent, to remove the oxalic acid, coloring matter and other bitter principles and certain salts. If so desired the sugar solution may be pumped into large tanks filled with granulated animal bone charcoal, heated to 50-100° C. (72° C. preferred) and allowed to stand from 1 to 24 hours or until all of the coloring matter or pigment or as much of these substances as is desired is removed. The aqueous solution is then concentrated in vacuo to 37 to 47 degrees Beaumé. This product is liquid sugar.

Liquid sugar may be colored or water white in appearance. Liquid sugar and syrup made from molasses unfit for human use such as blackstrap, high test, beet or citrus and the like will contain sucrose, glucose or dextrose, fructose or levulose in significant amounts. It may also contain small amounts of pentose sugars. As previously stated it is distinctively understood that liquid sugar as made from molasses by the disclosed process will contain a measureable amount of valuable nonsugar solids in the form of essential minerals or elements, water-soluble vitamins such as vitamin $B_1$, biotin, riboflavin, nitrogenous bodies, outstanding pectins and nucleic acids which will serve as a means of identifying the liquid sugar with the process. Liquid sugar has never been made commercially from the various molasses products. Many attempts have been made but all have ended in failure. Either there was too much minerals in the final product or it was found impossible to remove the objectionable coloring matter, gums, bitter principles and objectionable flavors in an economical and scientific manner. The above process is therefore new and novel as it affords a commercial method for obtaining these valuable food materials which heretofore have been discarded and not available for human use. The hydrolysis of the molasses as employed in this process splits gums, pectins, polysaccharides and glucosides into simple sugars and affords an opportunity to remove the bitter principles and objectionable colloidal matter. Gums and pectins in their original state makes the filtration of molasses very difficult or impractical while the bitter glucosides make it unfit for edible purposes. The formation of simple sugars also increases the yield from the process and hydrolyzes enough of the sucrose so that it will remain in the liquid state. The basic compounds or salts used as precipitants are unusual as they will remove undesirable proteins, anions such as oxalates, tannates, malates, citrates, sulphates, sulphides, carbonates, fluorides, chromates, hydroxyl and the like. They will partially remove chlorides, bromides, phosphates and iodides. Basic lead acetate is an exceptional precipitant for this purpose. The oxalic acid treatment removes such cations as lead, zinc, magnesium, strontium, barium, and the like. It also partially removes cations such as calcium, sodium and thallium. The oxalic acid as employed herein is used as an adjunct to animal bone charcoal in removing coloring matter and bitter principles.

Sugar in the solid form may be prepared from blackstrap by spray drying, or drum drying of the liquid sugar obtained above. It may be obtained in pure state from this source by recognized and known methods.

A final example of the application of this invention for the production of liquid sugar and edible syrup from fruit juices of which citrus juice and citrus press water are used for illustrative purposes is as follows:

The press waters and juices from citrus fruit such as oranges, grapefruit, tangerines and the like are filtered to remove the dirt, inert solids and fibrous matter. Either the leaf or press type filter may be employed as the liquid is quite fluid. The filtrate is then treated with sulphuric acid to hydrolyze the glucosides contained therein. Usually, ¼ to ½ per cent of acid is sufficient for this purpose. The citrus juice is heated from 50-100° C. (72° C. preferred) for 10-30 minutes. It is then treated with a paste of unslaked lime to neutralize the excess sulphuric acid and brought up to a pH of 7.0. It is then heated to 50-75° C. to precipitate the citric acid as calcium citrate. This compound is insoluble in hot solution. The citrus juice is then filtered to remove the calcium citrate. It is advisable to let most of this material settle to the bottom of the tank as it plugs up the filter in a short time if this is not taken into account. The calcium citrate is recovered and treated with sulphuric acid to free the citric acid from the calcium. It is separated from calcium sulphate formed by filtration. The citrus juice free of the citric acid may now be treated with basic lead salts such as basic lead acetate if the citrus fruit juice is rich in tannates, glucosides etc. Usually ¼ to 1 per cent is sufficient amount of the salt. If tannates and other organic substances are not present in a sufficient amount the lead treatment may be omitted. The citrus juice is then treated with oxalic acid to remove a portion of the calcium, lead, barium, strontium ions. They form as an insoluble material and may be removed by filtration. Usually ¼ to 2 per cent of oxalic acid is sufficient to remove them. The oxalic acid will also partially remove sodium and lithium ions. The precipitate which is formed is allowed to settle and the aqueous solution filtered. A press type filter using duck cloth and filter paper is satisfactory for this purpose. At this point the solution is usually free of lead, barium, strontium and other objectionable ions making this process superior and improved over other methods. At this point the solution is usually treated with ½ to 3 per cent of activated animal bone charcoal or other activated products of similar quality and heated to 50-100° C. If so desired the bone char may be kept suspended by stirring. After objectionable flavors and coloring matter have been removed the solution is again filtered to remove the suspended bone char. As an alternate to this treatment the citrus solution containing oxalic acid is pumped into tanks filled with granulated animal bone char. The liquid should be heated to 50-100° C. and allowed to stand until all color is removed. The time required varies from a few minutes to 12 hours. The filtered water white solution is concentrated in vacuo or under partial reduced pressure to a 37-47 degree liquid sugar.

As a variation on my process as applied to citrus juices such as grapefruit and orange juice, the juice is only retained in the char bone treatment last described above for a sufficient time to remove the oxalic acid and bitter glucosides or other bad tasting elements and not long enough to remove much of the color and the concentration step is omitted. The result of such a process will be a citrus juice that is very palatable and of good appearance without addition of sugar. This variation works even better if the oxalic acid is neutralized with a little lime and the precipitate removed by filtration or otherwise before the short bone char treatment. If desired artificial color could be added to the citrus juice to improve its appearance.

It is understood that wherever the term filter or filtration is used in this specification and claims other physical means of separating solids from liquids such as centrifuging, settling and decantation are included.

If solid sugar material from citrus fruit juices is desired it may be obtained by spray drying liquid sugar obtained above or by concentrating the syrup and crystallizing the sugar therefrom. It may also be obtained by simply dehydrating the liquid sugar.

Liquid sugars disclosed herein should not be confused with cane molasses made from cane juice as the latter product is colored, has more than 7 per cent nonsugar solids and is therefore a molasses and not a liquid sugar or syrup.

The amount of nonsugar solids in a sugar fluid product determines whether it is a molasses, a liquid sugar or merely pure crystalline sugar dissolved in water. Cane molasses as now made contains more than 7 per cent nonsugar solids, liquid sugar contain from a trace to not more than 7 per cent of nonsugar solids while pure crystalline sugar dissolved in distilled water is devoid of nonsugar solids. The appearance of the fluid is not the distinguishing factor.

A liquid sugar may be made conveniently from crystalline sugars of commerce. As an illustration the following is cited: To 70 grams of crystalline sucrose is added ½ gram of iodized sodium chloride, 10 milligrams of ferric chloride (anh.) 100 milligrams of calcium chloride, 5 milligrams of manganese sulphate and 24 grams of a 1 per cent hydrochloric acid solution. The mixture is heated to 60-100° C. (72° C. preferred) for 1-20 minutes until a portion of the sucrose is hydrolyzed to fructose and glucose or dextrose. To the warm mixture is added 6 grams of an equal mixture of sodium and potassium phosphate and stirred until dissolved. Then 1 milligram of vitamin $B_1$ is added. This liquid sugar contains an assortment of sugars as well as a definite and controlled amount of valuable nonsugar solids. This product is more easily assimilated than cane sugar and it supplies the trade with nonsugar solids found deficient in most food products. It is a sweetening material yet has valuable food nutrients not found in other sugars of commerce.

While in the foregoing description a number of illustrations and examples have been given, it will be understood that the present invention is not limited in its application to the specific examples described nor to the specific applications of liquid sugar or syrup manufacture. This invention primarily contemplates the manufacture or production of liquid sugar, edible syrups from natural sugar bearing fluids such as sugar cane or sugar beet juice, molasses unfit for human use and fruit juices such citrus fruits and citrus press waters by a process whereby a superior product is made and one which contains a measurable amount of nonsugar solids such as water soluble vitamins, mineral salts, nucleic acids, nitrogenous matter and the like. Since it is apparent that many modifications, applications and adoptions of the present invention will present themselves to others skilled in the art without departing from the spirit of this invention, it is understood that the use of such individual features as do not depart from the spirit of this invention are, although not specifically described herein, contemplated by and within the scope of the appended claims.

Having described my invention, what is claimed:

1. A liquid sugar made from sugar cane juice adaptable as a liquid sweetening material for human use and in the manufacture of confectionery, preserved fruits, jellies, food and beverage products consisting of dextrose, levulose, and sucrose in a concentrated liquid state of from 37 to 47 degrees Beaumé, and not less than 3 micrograms nor more than 70,000 micrograms of valuable water soluble vitamins and other nonsugar solids per gram of liquid sugar.

2. A liquid sugar made from sugar cane juice adaptable as a liquid sweetening material for human use and in the manufacture of confectionery, bakery goods, preserved fruits, jellies, food products, soft drinks and alcoholic beverages consisting of glucose, levulose and sucrose in a concentrated liquid state of from 37 to 47 degrees Beaumé, and not less than 3 micrograms nor more than 70,000 micrograms of water soluble B vitamins, nitrogenous bodies, pectins and mineral nonsugar solids per gram of liquid sugar.

3. A liquid sugar made from feeding molasses and molasses waste adaptable as a liquid sweetening material for human use and in the manufacture of food and beverage products consisting of glucose, levulose and sucrose in a concentrated liquid state of from 37 to 47 degrees Beaumé, and not less than 1 milligram nor more than 7 grams of valuable nutritional nonsugar solids per 100 grams of liquid sugar.

4. A sweetening material made from feeding molasses and molasses waste adaptable for human consumption and in the manufacture of food products, soft drink and alcoholic beverages consisting of dextrose, levulose, arabinose and sucrose in solid and powdered form, and not less than 3 micrograms nor more than 70,000 micrograms of valuable nutritional nonsugar solids per gram of powdered sugar.

5. An edible syrup made from feeding molasses and molasses waste adaptable as a liquid sweetening material for table use and in the manufacture of food and beverage products consisting of glucose, levulose, arabinose and sucrose in a concentrated liquid state of from 37 to 47 degrees Beaumé, and not less than 3 micrograms nor more than 70,000 micrograms of water soluble B vitamins, nitrogenous bodies, pectin and mineral nonsugar solids per gram of syrup.

6. In the art of sugar manufacture, the process for producing water white liquid sugar from colored sugar bearing juices and fluids which comprises incomplete hydrolysis of the juice at a temperature from 50° to 100° C. for 5 to 20 minutes, separation of insoluble matter by filtration and centrifuging, precipitation of anions with a basic salt, removal of alkaline earths and divalent metallic elements as insoluble oxalates, removal of coloring matter by adsorption with activated charcoal and bleach, and concentration of water white sugar solution to desired Beaumé so that the finished product contains not less than 3 micrograms nor more than 70,000 micrograms of nonsugar solid per gram of liquid sugar.

7. In the art of sugar manufacture, the process for producing mono and di saccharose sugars in a concentrated water white liquid state from colored sucrose bearing juices which comprises incomplete acid hydrolysis of the juice at a temperature from 50° to 100° C. for 5 to 20 minutes, precipitation of anions with a basic salt with subsequent settling and separation to remove the precipitate, removal of alkaline earths and divalent metallic elements as insoluble oxalates, removal of coloring matter with animal bone charcoal and bleach, and concentration of water white solution so that the finished product contains not less than 3 micrograms nor more than 70,000 micrograms of nonsugar solid per gram of liquid sugar.

8. In the art of sugar manufacture, the process for producing mono and disaccharose sugars in a concentrated water white liquid state from sugar cane juice which comprises incomplete acid hydrolysis at 50–100° C. with pH of 1.5 to 6.0 for 5 to 20 minutes, precipitation of anions with basic lead acetate with subsequent settling and separation to remove the precipitate, removal of alkaline earths and divalent elements as insoluble oxalates, removal of coloring matter with animal bone charcoal, and concentration of water white sugar solution so that the finished product contains not less than 3 micrograms nor more than 70,000 micrograms of nonsugar solids per gram of liquid sugar.

9. In the art of sugar manufacture, the process for producing liquid sugar from sugar cane juice which comprises acid hydrolysis of the juice at 50–100° C. with a pH of 1.5 to 6.0 for 5–30 minutes, precipitation of anions with ¼ to 2 per cent of basic lead acetate, removal of alkaline earths and metallic divalent elements as insoluble oxalates by separating and removing the precipitate, removal of coloring matter by adsorption with animal bone charcoal in an oxalic acid medium, and concentration of sugar solution under reduced pressure so that the finished product contains not less than 3 micrograms nor more than 70,000 micrograms of water soluble B vitamins, nitrogenous bodies, pectins and mineral nonsugar solids per gram of liquid sugar.

10. A process for producing liquid sugar from inedible molasses adaptable for human use which comprises the hydrolysis of the fluid molasses at a temperature from 50° to 100° C. for 5 to 20 minutes, precipitation of anions with a basic and alkaline producing compound, removal of alkaline earth and divalent elements as insoluble oxalates, adsorption of bitter principles with an activated charcoal and concentration of sugar solution so that the finished product contains not less than 3 micrograms nor more than 70,000 micrograms of nonsugar solids per gram of liquid sugar.

11. A process for producing an edible water white liquid sugar from inedible molasses which comprises treating molasses with a Beaumé of 5-35 degrees with one-eighth to one-half per cent sulphuric acide and heating the solution with pH .5-6.0 at 50-100° C. for 5-30 minutes, adjustment of pH to 5 with milk of lime, precipitation of anions with ¼ to 2 per cent of basic lead acetate, with subsequent settling, filtration and centrifuging, removal of alkaline earth and divalent elements as insoluble oxalates with ¼ to 2 per cent of oxalic acid and subsequent separation, adsorption of coloring matter with animal bone charcoal in oxalic acid medium, concentration of sugar solution so that finished product contains from 3 to 70,000 micrograms of nonsugar solids per gram of liquid sugar.

12. A method for preparing a highly nutritious edible syrup consisting of hydrolysis at 50° to 100° C. for 5 to 20 minutes of 70 grams of sucrose with 30 cubic centimeters of a one per cent hydrochloric acid solution to which is added 1 milligram of anhydrous ferric chloride one-half gram iodized salt, 100 milligrams of manganese sulphate 1 milligram of vitamin $B_1$ and 6 grams of sodium and potassium hydrogen phosphate.

13. The process of producing a palatable liquid sugar from sugar bearing fluids which comprises filtering the fluid, incompletely hydrolizing the fluid, precipitation of anions with a basic salt, removal of alkali and alkaline earth metals and divalent metallic elements by adding oxalic acid, removing of coloring matter by adsorption with activated charcoal and bleach, and concentration of water white sugar solution so that the product contains from 3 to 70,000 micrograms of nonsugar solid per gram of liquid sugar.

14. The process of producing water white liquid sugar from sugar bearing fluids which comprises filtering the fluid, incompletely hydrolizing the fluid, precipitating anions with basic lead acetate, removing the precipitate, precipitating divalent metallic elements and alkali metals with oxalic acid, removing coloring matter with adsorbent charcoal and bleach and concentrating the fluid so that the product contains from 3 to 70,000 micrograms of nonsugar solid per gram of liquid sugar.

15 A water white liquid composition of matter made from colored sugar bearing fluid, adaptable as a sweetening material for foods, beverages and for human consumption, said liquid composition comprising mono saccharose and di saccharose sugars, and from 3 to 70,000 micrograms of water soluble vitamins and other nonsugar solids per gram of liquid sugar having a concentration of 37° to 47° Beaumé.

16. A water white liquid composition of matter comprising sucrose, together with other mono and di saccharose sugars and from 3 to 70,000 micrograms of water soluble vitamin B, and other nonsugar solids per gram of liquid sugar composition having a concentration of 37° to 47° Beaumé.

17. A water white liquid composition of matter comprising sucrose, dextrose and levulose in a concentrated liquid state of 37° to 47° Beaumé, and containing from 3 to 70,000 micrograms of vitamin B, potassium acid phosphate, iodized salt, manganese sulphate and other nonsugar solids per gram of liquid composition.

18. A water white composition of matter made from sugar cane juice adaptable as a liquid sweetening material for human use and in the manufacture of food and beverage products comprising mono and di-saccharide sugars in a liquid state having a Beaumé of 37° to 47° and from 3 to 70,000 micrograms of water soluble vitamins and other nonsugar solids per gram of liquid sugar.

19. A superior sweetening material made from sugar cane juice in a crystalline and powdered form adaptable for human consumption and in the manufacture of food products, soft drinks and alcoholic beverages comprising sucrose, together with other mono-saccharose and di-saccharose sugars and from 3 micrograms to 70,000 micrograms of valuable water soluble vitamins and other nonsugar solids per gram of sugar.

20. A water white liquid composition of matter made from colored sugar cane juice adaptable as a sweetening material for foods, beverages and other home consumption, said liquid composition comprising mono-saccharose sugars, and from 3 to 70,000 micrograms of water soluble vitamins and other nonsugar solids per gram of liquid sugar having a concentration of 37° to 47° Beaumé.

21. The process of obtaining sugar in solid form without the formation of molasses which comprises spray drying the water white liquid composition of matter made from colored sugar bearing fluid in accordance with the process of claim 6, adaptable as a sweetening material for foods, beverages and for human consumption, said liquid composition comprising mono saccharose and di saccharose sugars, and from 3 to 70,000 micrograms of water soluble vitamins and other nonsugar solids per gram of liquid sugar having a concentration of 37° to 47° Beaumé.

22. The process of obtaining sugar in solid form without the formation of molasses which comprises dehydrating the water white liquid composition of matter made from colored sugar bearing fluid in accordance with the process of claim 6, adaptable as a sweetening material for foods, beverages and for human consumption, said liquid composition comprising mono saccharose and di saccharose sugars, and from 3 to 70,000 micrograms of water soluble vitamins and other nonsugar solids per gram of liquid sugar having a concentration of 37° to 47° Beaumé.

JOHN PAUL BARTZ.

REFERENCES CITED

The following references are of record in the file of this patent:

UNITED STATES PATENTS

| Number | Name | Date |
|---|---|---|
| 1,534,166 | Dahlberg | Apr. 21, 1925 |
| 1,608,010 | Takamine et al. | Nov. 23, 1926 |
| 2,395,907 | Peckham, Jr. | Mar. 5, 1946 |
| 2,408,418 | Erickson | Oct. 1, 1946 |